US012499466B2

(12) United States Patent
Asbury et al.

(10) Patent No.: US 12,499,466 B2
(45) Date of Patent: *Dec. 16, 2025

(54) METHODS, SYSTEM, AND NON-TRANSITORY COMPUTER-READABLE MEDIUM FOR AUTOMATIC GENERATION OF IMAGE-BASED PRINT PRODUCT OFFERING

(71) Applicant: FUJIFILM North America Corporation, Valhalla, NY (US)

(72) Inventors: Christopher Asbury, Rochester, NY (US); Ryan Moore, Rochester, NY (US); William A. Fuss, Rochester, NY (US); Jason Womer, Rochester, NY (US); George Jegadesh, Rochester, NY (US); Victor Moudgil, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,091

(22) Filed: Jun. 6, 2022

(65) Prior Publication Data

US 2022/0301030 A1 Sep. 22, 2022

Related U.S. Application Data

(63) Continuation of application No. 17/069,164, filed on Oct. 13, 2020, now Pat. No. 11,354,717, which is a (Continued)

(51) Int. Cl.
*G06Q 30/00* (2023.01)
*G06F 18/24* (2023.01)
(Continued)

(52) U.S. Cl.
CPC ........ *G06Q 30/0241* (2013.01); *G06F 18/24* (2023.01); *G06Q 30/0621* (2013.01); (Continued)

(58) Field of Classification Search
CPC ............... G06Q 30/0601–0645; G06K 9/6267
See application file for complete search history.

(56) References Cited

U.S. PATENT DOCUMENTS 6,950,198 B1 * 9/2005 Berarducci ........ G06Q 30/0601
705/26.1
7,840,646 B2 11/2010 Davis et al.
(Continued)

OTHER PUBLICATIONS

Alexander P. Pentland, Rosalind W. Picard, and S. Scarloff "Photobook: tools for content-based manipulation of image databases", Proc. SPIE 2185, Storage and Retrieval for Image and Video Databases II, (Apr. 1, 1994); https://doi.org/10.1117/12.171786 (Year: 1994).*
(Continued)

*Primary Examiner* — Jeffrey A. Smith
*Assistant Examiner* — Kennedy Gibson-Wynn
(74) *Attorney, Agent, or Firm* — Woods Oviatt Gilman LLP; Dennis B. Danella, Esq.

(57) ABSTRACT

A method for generating and displaying a print product offering including a plurality of digital images is provided. In one aspect the method comprises: generating a group of digital images from the plurality of digital images; classifying each of the digital images within the group based on at least one image quality parameter that includes an average image quality based on at least one characteristic of the digital images; selecting only the digital images in the group which conform to the image quality parameter for inclusion in the print product offering; providing a pre-developed electronic image product layout including a plurality of virtual orifices; populating the plurality of virtual orifices with only the digital images which conform to the image
(Continued)

quality parameter to provide an image product template design; and displaying the image product template design as the print product offering on a display of a computing device.

15 Claims, 3 Drawing Sheets

Related U.S. Application Data continuation of application No. 15/189,487, filed on Jun. 22, 2016, now Pat. No. 10,803,505.

(51) Int. Cl.
*G06Q 30/0241* (2023.01)
*G06Q 30/0601* (2023.01)
*G06V 10/764* (2022.01)
*G06V 10/772* (2022.01)
*G06V 10/98* (2022.01)

(52) U.S. Cl.
CPC .......... *G06V 10/764* (2022.01); *G06V 10/772* (2022.01); *G06V 10/993* (2022.01)

(56) References Cited

U.S. PATENT DOCUMENTS

| | | | |
|---|---|---|---|
| 8,848,972 B2 | 9/2014 | Chen et al. | |
| 8,897,597 B2 | 11/2014 | Chen et al. | |
| 10,803,505 B2 | 10/2020 | Asbury et al. | |
| 2004/0070597 A1 | 4/2004 | Van Epps | |
| 2004/0119876 A1* | 6/2004 | Ohmori ................ | H04N 23/71 |
| | | | 348/E5.035 |
| 2006/0187833 A1 | 8/2006 | Montulli et al. | |
| 2007/0247666 A1 | 10/2007 | Tsitoukis | |
| 2008/0101762 A1 | 5/2008 | Kellock et al. | |
| 2008/0129034 A1 | 6/2008 | Anderson et al. | |
| 2010/0123732 A1 | 5/2010 | Jenks et al. | |
| 2011/0081088 A1 | 4/2011 | Xiao | |
| 2011/0157227 A1 | 6/2011 | Ptucha et al. | |
| 2012/0019687 A1 | 1/2012 | Razavi et al. | |
| 2012/0179571 A1 | 7/2012 | Grosso, III | |
| 2013/0262261 A1 | 10/2013 | Rozek et al. | |
| 2013/0301934 A1* | 11/2013 | Cok ..................... | G11B 27/034 |
| | | | 382/218 |
| 2013/0336543 A1* | 12/2013 | Bennett ................. | G06V 40/10 |
| | | | 382/100 |
| 2013/0346456 A1 | 12/2013 | Sparenberg et al. | |
| 2014/0096041 A1 | 4/2014 | Gowen et al. | |
| 2014/0195921 A1 | 7/2014 | Grosz et al. | |
| 2014/0270464 A1* | 9/2014 | Nepomniachtchi .... | G06V 30/40 |
| | | | 382/137 |
| 2015/0143236 A1 | 5/2015 | Tena Rodriguez et al. | |
| 2015/0370830 A1 | 12/2015 | Murphy-Chutorian et al. | |
| 2017/0048461 A1* | 2/2017 | Lee ........................ | H04N 23/62 |
| 2017/0085507 A1 | 3/2017 | Abou Mahmoud et al. | |
| 2017/0193588 A1 | 7/2017 | Loui et al. | |

OTHER PUBLICATIONS

Potapova, Ekaterina, Marta Egorova, and Ilia Safonov. "Automatic photo selection for media and entertainment applications." GRAPHICON-2009. 2009. 117-124. (Year: 2009).*

Wang, Wiley, Patrick Teo, and Russ Muzzolini. "Automatic digital photo-book making system." Imaging and Printing in a Web 2.0 World; and Multimedia Content Access: Algorithms and Systems IV. Vol. 7540. SPIE, 2010. (Year: 2010).*

S. Rudinac, M. Larson and A. Hanjalic, "Learning Crowdsourced User Preferences for Visual Summarization of Image Collections," in IEEE Transactions on Multimedia, vol. 15, No. 6, pp. 1231-1243, Oct. 2013, doi: 10.1109/TMM.2013.2261481 (Year: 2013).*

Wallick, M. N. (2007). Automatic organization of large photo collections (Order No. 3278757). Available from ProQuest Dissertations and Theses Professional. (304781608). Year: 2007.

Egorova, M. A., and I. V. Safonov. "Algorithms for Photo Book Authoring." Pattern Recognition and Image Analysis 23.1 (2013): 57-67. ProQuest. Web. Jan. 25, 2022. Year: 2013.

Milburn, Ken, and Dave Johnson. "Do More with Digital Photos." PC World 12 2004: 86,90,95-98. ProQuest. Web. Sep. 17, 2021. Year: 2004.

* cited by examiner

METHODS, SYSTEM, AND NON-TRANSITORY COMPUTER-READABLE MEDIUM FOR AUTOMATIC GENERATION OF IMAGE-BASED PRINT PRODUCT OFFERING

CROSS-REFERENCE TO RELATED APPLICATIONS

This application is a continuation of U.S. patent application Ser. No. 17/069,164, filed Oct. 13, 2020, now U.S. Pat. No. 11,354,717, which is a continuation of U.S. patent application Ser. No. 15/189,487, filed Jun. 22, 2016, now U.S. Pat. No. 10,803,505, which are hereby incorporated by reference in their entirety.

TECHNICAL FIELD

The present invention is directed to a system and method for automatically generating a print product offering incorporating one or more digital images; in particular, the system and method is directed to automatically generating a print product offering using a plurality of uploaded digital images based on one or more image quality parameters, such as, but not limited to total data transfer sizes, data transfer rate, average image size, or total upload time.

BACKGROUND OF THE INVENTION

One method of generating an image-based print order is through the use of a photo lab computing device, such as a kiosk. A kiosk is typically located within a mass retail store, supermarket, drug store, or other convenient locations, and allows a customer to upload one or more digital images and generate a print order to manufacture a print product, such as a photo gift. Additional print product offerings may also be automatically created, displayed to the customer, and made available as an additional print order for upsell purposes (i.e., upsell products) as a stand-alone order, to supplement the customer generated print order, or as an upgrade or other type of add-on to the print product that is the subject of the customer generated print order. The print products identified in the selected print orders can then be fulfilled by a product finishing device within the kiosk itself, or by a finishing device in communication with the kiosk through a network, such as the Internet. The finishing device may be located in close proximity to the kiosk or at a remote location.

In order to generate a print order that is related to a photobook, for example, a plurality of digital images may need to be uploaded to the kiosk. In order to do so, customers need to save each digital image on a portable data storage device, such as a thumb drive, smart phone, or memory card, prior to connecting the portable data storage device to the media drive of the kiosk and uploading each digital image. Another way to upload the digital images is by using a print product ordering website made available over the Internet. In using an ordering website, a plurality of digital images are uploaded to a data storage server through the website by one or more users. The digital images may then be communicated to the kiosk through the network when they are uploaded.

When finalizing the print order for the selected print product, users may be required to review and edit their print order through a series of steps such as, for example, previewing their uploaded digital images, verifying that the uploaded digital images are a sufficient quality and/or size, sorting the digital images by populating a product template in a desired sequence and positioning, and customizing the product template to fit the user's specific needs. However, this methodology is often inconvenient and inefficient for users because it requires them to spend valuable time and energy making many unwanted, tedious decisions which come with reviewing, analyzing, and determining image quality and placement, so as to ensure the fulfillment of their print product will turn out as desired. This inconvenience may deter users from generating print orders because they may not be qualified to make these determinations properly through a kiosk display, or end up removing digital images that would otherwise be incorporated into the print product.

To address this issue, image organizing modules have been developed and incorporated into kiosks and other print ordering platforms to make generation of a print order more convenient and efficient. These modules generally remove steps on the part of the user by attempting to determine the quality of uploaded digital images to determine if a print product offering is suitable and able to be generated. In order to do so, existing organizing modules depend on a predetermined image checking parameter, namely the total number of images uploaded to determine if a print product offering, such as a photobook, is able to be generated. For example, if a total of ten digital images are uploaded, by a customer, and the organizing module determines that this meets or exceeds a predetermined threshold, then the organizing module would generate and display a print product offering to the customer. However, using the total number of images uploaded is not necessarily indicative of the image quality of each of the uploaded digital images, and therefore may not result in a print product offering that includes digital images of the quality required to fulfill the print product being offered to the customer by the organizing module.

What is needed is a system and method by which a print product offering is automatically generated and displayed to the customer, so as to make their experience efficient, convenient, and encouraging of similar future experiences. What is further needed is a system and method by which a print product offering is generated based on one or more image quality parameters that are indicative of digital image quality, which thereby results in a better quality print product. The present invention fulfills these needs as well as other needs.

SUMMARY OF THE INVENTION

One aspect of the present invention is directed to a computer-implemented method of generating and displaying a print product offering including a plurality of digital images using a photo lab computing device comprising a memory and a processor. The method, utilizing the processor, comprises the steps of: providing a plurality of digital images stored in the memory; generating a group of digital images from the plurality of digital images; classifying each of the digital images within the group based on at least one image quality parameter, wherein the at least one image quality parameter includes an average image quality based on at least one characteristic of the digital images; selecting only the digital images in the group which conform to the at least one image quality parameter for inclusion in the print product offering, wherein the at least one image quality parameter is predetermined so that the selected digital images are of sufficient quality to be included in the print product offering; providing a pre-developed electronic image product layout including a plurality of virtual orifices; populating the plurality of virtual orifices with only the digital images which conform to the at least one image quality parameter to provide an image product template design; and displaying the image product template design as the print product offering on a display of the photo lab computing device. A non-transitory computer-readable medium having thereon computer-executable instructions for performing the computer-implemented method is also provided.

In another aspect, a computer-implemented system for generating and displaying a print product offering including a plurality of digital images is provided. The system comprises a photo lab computing device comprising a memory, a processor, and a display. A plurality of digital images are stored in the memory, and the memory has an image organizing module stored therein. The image organizing module utilizes the processor to: a) generate a group of digital images from the plurality of digital images; b) classify each of the digital images within the group based on at least one image quality parameter, wherein the at least one image quality parameter includes an average image quality based on at least one characteristic of the digital images; c) select only the digital images in the group which conform to the at least one image quality parameter for inclusion in the print product offering, wherein the at least one image quality parameter is predetermined by the image organizing module so that the selected digital images are of sufficient quality to be included in the print product offering; d) provide a pre-developed electronic image product layout including a plurality of virtual orifices; e) populate the plurality of virtual orifices with only the digital images which conform to the at least one image quality parameter to provide an image product template design; and f) display the image product template design as the print product offering on the display of the photo lab computing device.

Additional objects, advantages and novel aspects of the present invention will be set forth in part in the description which follows, and will in part become apparent to those in the practice of the invention, when considered with the attached figures.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawings, wherein.

DETAILED DESCRIPTION OF THE INVENTION

Generally, the tools and methods described herein may be implemented in hardware, software or a combination thereof. As will be described in more detail below, the present invention is directed to a system and method for automatically generating and displaying a print product offering including a plurality of digital images based on an image quality parameter. In general, the method comprises the steps of providing a photo lab computing device comprising a memory, wherein a plurality of digital images are stored in the memory; generating a group of digital images from the plurality of digital images; classifying each of the digital images within the group based on at least one image quality parameter; selecting one or more of the digital images in the group which conform to the at least one image quality parameter; generating an image product template design including the digital images which conform to the at least one image quality parameter; and displaying the image product template design as a print product offering. Exemplary details relating to the implementation of the above-referenced method will be described in more detail below.

Figure 1:
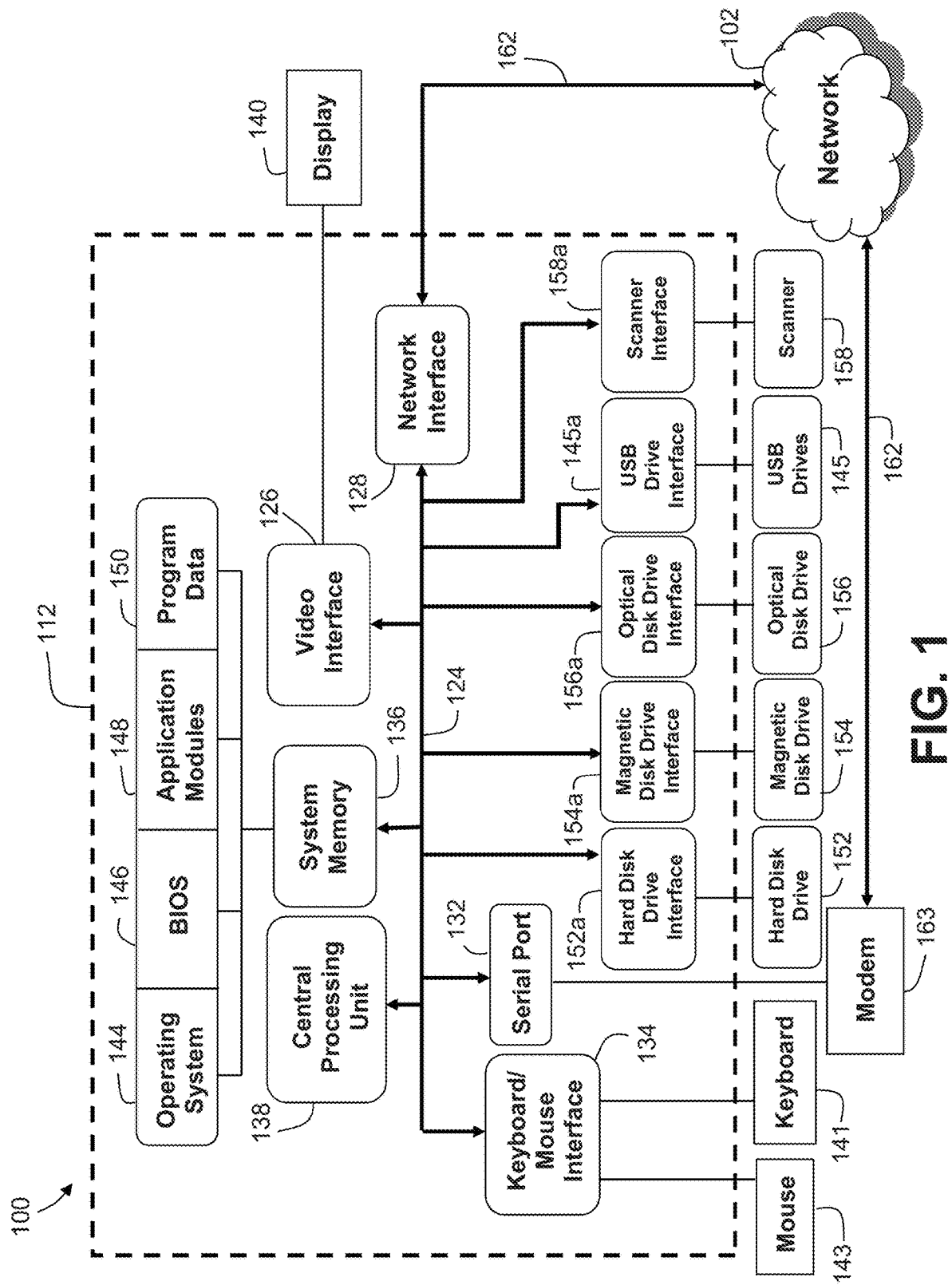
FIG. 1 is a block diagram generally illustrating an exemplary computing environment in which an aspect of the invention may be implemented.
Figure 2:
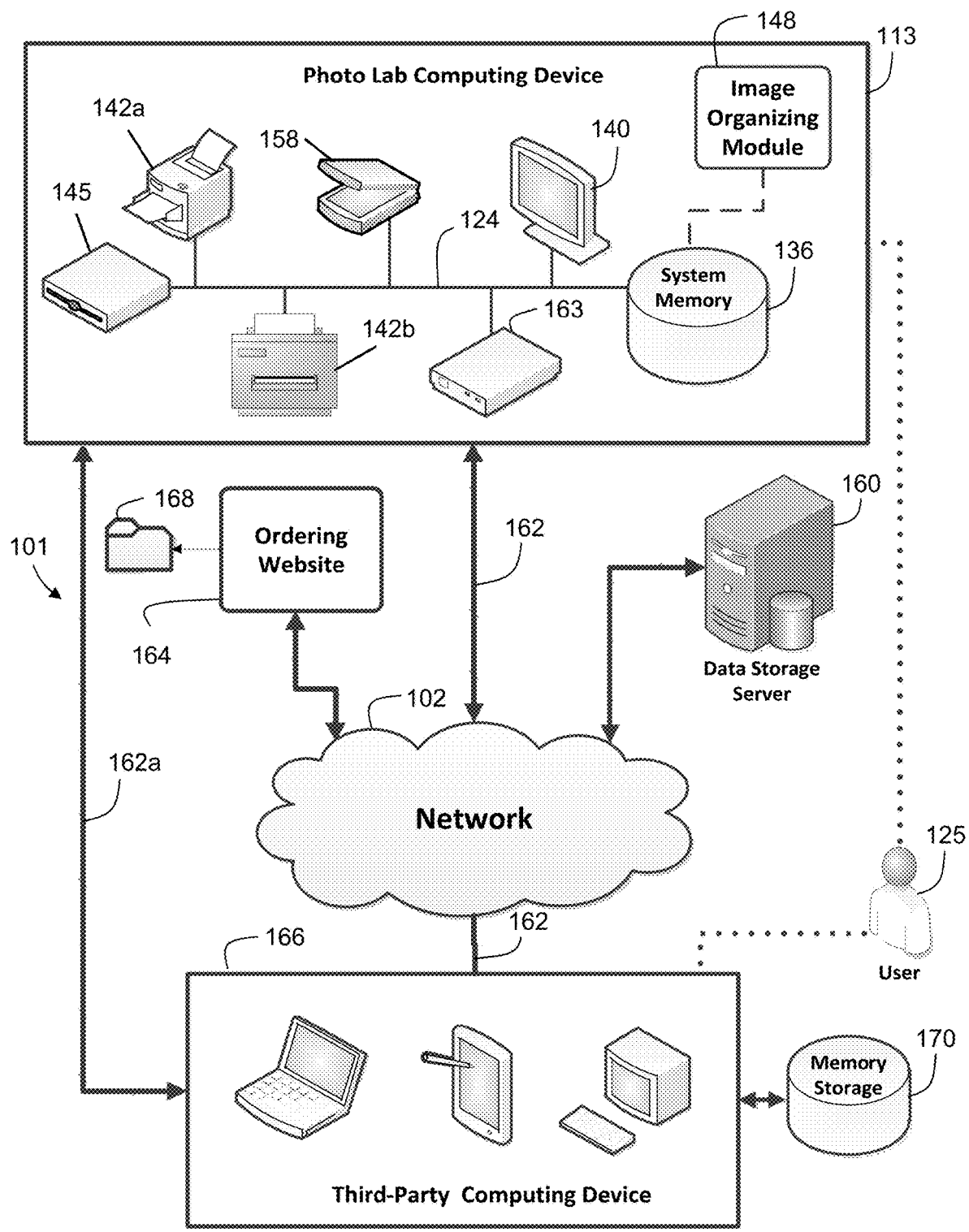
FIG. 2 is a schematic diagram showing a system in which an aspect of the present invention may be incorporated.

Referring to the drawings in detail, FIG. 1 shows an exemplary computing environment 100 that may be used to implement any of the processing described herein (e.g., photo lab computing device 113 such as a kiosk, third party computing device 166 such as a mobile computing device, tablet, or desktop computer). Computing environment 100 may include one or more computers 112 comprising a system bus 124 that couples a video interface 126, network interface 128, a keyboard/mouse interface 134, and a system memory 136 to a Central Processing Unit (CPU) 138. A display 140 is connected to bus 124 by video interface 126 and provides a user 125 (FIG. 2) with a graphical user interface (GUI) to view, select and order the images as image effects (e.g., print order offering, such as a photobook). The GUI allows the user to enter commands and information into computer 112 using a keyboard 141 and a user interface selection device 143, such as a mouse or other pointing device. Keyboard 141 and user interface selection device are connected to bus 124 through keyboard/mouse interface 134. Other peripheral devices may be connected through a media drive 145 such as, for example, a universal serial bus (USB) drive to transfer information to and from computer 112. For example, flash memory devices (e.g., compact flash, memory stick/PRO and DUO, SD card, multimedia card, smart media xD card) may be connected to computer 112 through serial port 132, media drive 145, or to bus 124 through other equivalent ports so that data representative of one or more digital images, or other digital content may be downloaded to memory 136 or another memory storage device associated with computer 112 such that the images may be subsequently displayed as an image effect of a design template comprising the images on display 140, generated into a print order offering, a print order, and/or manufactured as a print product by one or more finishing devices 142*a*, 142*b* (FIG. 2). The digital images may moreover be provided by capturing a digital picture using a camera, camcorder, or some other image capture device.

The system memory 136 is also connected to bus 124 and may include read only memory (ROM), random access memory (RAM), an operating system 144, a basic input/output system (BIOS) 146, application modules 148 (e.g., image organizing module) and program data 150. The computer 112 may further include a hard disk drive 152 for reading from and writing to a hard disk, a magnetic disk drive 154 for reading from and writing to a removable magnetic disk (e.g., floppy disk), and an optical disk drive 156 for reading from and writing to a removable optical disk (e.g., CD ROM or other optical media). The computer 112 may also include a scanner 158 for scanning items such as still image photographs to be downloaded to computer 112. A hard disk drive interface 152*a*, magnetic disk drive interface 154*a*, an optical drive interface 156*a*, a USB drive interface 145*a*, and a scanner interface 158*a* operate to connect bus 124 to hard disk drive 152, magnetic disk drive 154, optical disk drive 156, media drive 145 and scanner 158, respectively. Each of these drive components and their associated computer-readable media may provide computer 112 with non-volatile storage of computer-readable instruction, program modules, data structures, application programs, an operating system, and other data for computer 112. In addition, it will be understood that computer 112 may also utilize other types of computer-readable media in addition to those types set forth herein, such as digital video disks, random access memory, read only memory, other types of flash memory cards, magnetic cassettes, and the like. Digital images may also therefore be provided from hard disk drive 152 or other data optical or magnetic storage devices, or accessed through the network 102 from an image-based print product ordering website (FIG. 2) in connection with a data storage server 160 (FIG. 2), as will be described in more detail below.

As best seen in FIGS. 1 and 2, one aspect of the present invention includes a system 101 for generating and displaying a print product offering through a photo lab computing device 113, such as, for example, a kiosk. As stated above, photo lab computing device 113 may generally incorporate hardware such as one or more finishing devices 142a and 142b, modem 163, display 140 (e.g. monitor), USB port 145, scanner 158, and memory 136. Memory 136 is configured to store, among other things, an image organizing module 148 which may be embodied as a non-transitory computer-readable medium having computer-executable instructions to perform the processing described herein. Photo lab computing device 113 may be connected to a network 102, such as the Internet, via communication line 162 via the modem 163 or network interface 128. The finishing devices 142a, 142b may be incorporated within photo lab computing device 113, or located in a remote location, such as a fulfillment center (not shown), and be in communication with each other using network 102. It should be understood that network 102 may be a wide area network (WAN), local area network (LAN), or other type of network that is in the form of wired or wireless connection, such as a Wi-Fi network. The fulfillment center may be, for example, a mass retail store or a drug store.

Each of the finishing devices 142a, 142b may be a printing device that is configured for manufacturing a print product that incorporates one or more digital images associated with a print order. A print product can be any type of good that has a selected digital image printed thereon, such as, for example, photographic print, photobook, calendar, mug, poster, T-shirt, mouse pad, quilt, gift cards, canvas prints and the like. When a print order incorporates a large number of digital images, for instance, the digital images may highlight a certain event across temporal boundaries (e.g., weddings, parties, ceremonies, etc.). When the print order is a photo book, it may include a front and back cover page and one or more internal image pages which include at least one incorporated digital image. Each cover page may also include its own unique digital image. Given the wide variety of print products that may be produced, system 113 may include a plurality of different types of finishing devices 142a, 142b, etc. each of which being capable of manufacturing the print products.

Each finishing device 142a, 142b is configured for receiving the print order from the photo lab computing device 113 and in turn manufacturing the print product using information contained or referenced in the print order, including but not limited to the digital images uploaded by the customer, and other aspects of the print product specified by the customer. While FIG. 2 shows each finishing device 142a, 142b connected to photo lab computing device 113 via the system bus 124, it should be understood that each finishing device 142a, 142b may directly receive the print order through network 102 via communication line 162. Further, the processor of computer 113 may be in communication with each of the finishing devices 142a, 142b, and configured for communicating the print order to the appropriate finishing device 142a, 142b depending on the capabilities of the finishing device 142a, 142b and contents of the print order. As such, computer 113 may serve as a central hub for the plurality of finishing devices 142a, 142b, etc., thereby providing an arrangement where the plurality of finishing devices are transparent to the customer so that the customer appears to be dealing with a single finishing device to simplify the system from the customer's perspective.

System 101 may also include an image-based print product ordering website 164 (i.e., ordering website) in communication with network 102. Ordering website 164 allows a user 125 (e.g., customer) to upload digital images to the website 164 via a third-party computing device 166. Ordering website 164 is then able to communicate the digital images to photo lab computing device 113 via the network 102. Ordering website 164 may further include an electronic sharing folder 168 which is accessible by more than one user 125 from various computing devices 166. When each user 125 uploads base digital images in folder 168, all users with access to folder 168 may use, modify, copy and/or remove these base digital images and communicate each to photo lab computing device 113. A data storage server 160 may also be in communication with ordering website 164 via network 102 to provide any one or more of a variety of functions including serving as a web server, data store, and application server and/or provide other services that will provide photo lab computing device 113 with access to base digital images uploaded by ordering website 164, or provide a storage location for base digital images for future use.

It should be understood that third-party computing device 166 may be any type of smart phone, mobile computing device, tablet, or desktop computer that is capable of displaying digital images and communicating with photo lab computing device 113 through network 102 using communication line 162 or directly using communication line 162a. In certain instances, computing device 166 may include one or more application modules (non-transitory computer-readable mediums having computer-executable instructions) that operate to allow user 125 to capture, save, and/or edit digital images in a memory storage 170 of computing device 166 or by a third party (e.g., ordering website 168) that provides for the storage of digital images, such as data storage server 160. For example, INSTAGRAM® and IPHOTO® are two such mobile applications that allow for this functionality. Instead of using third-party computing device 166, it should be understood that a thumb drive may be used to transfer digital images to photo lab computing device 113 using USB drive 145, or a printed image may be scanned using a scanner 158 thereby directly communicating image data to photo lab computing device 113.

Figure 3:
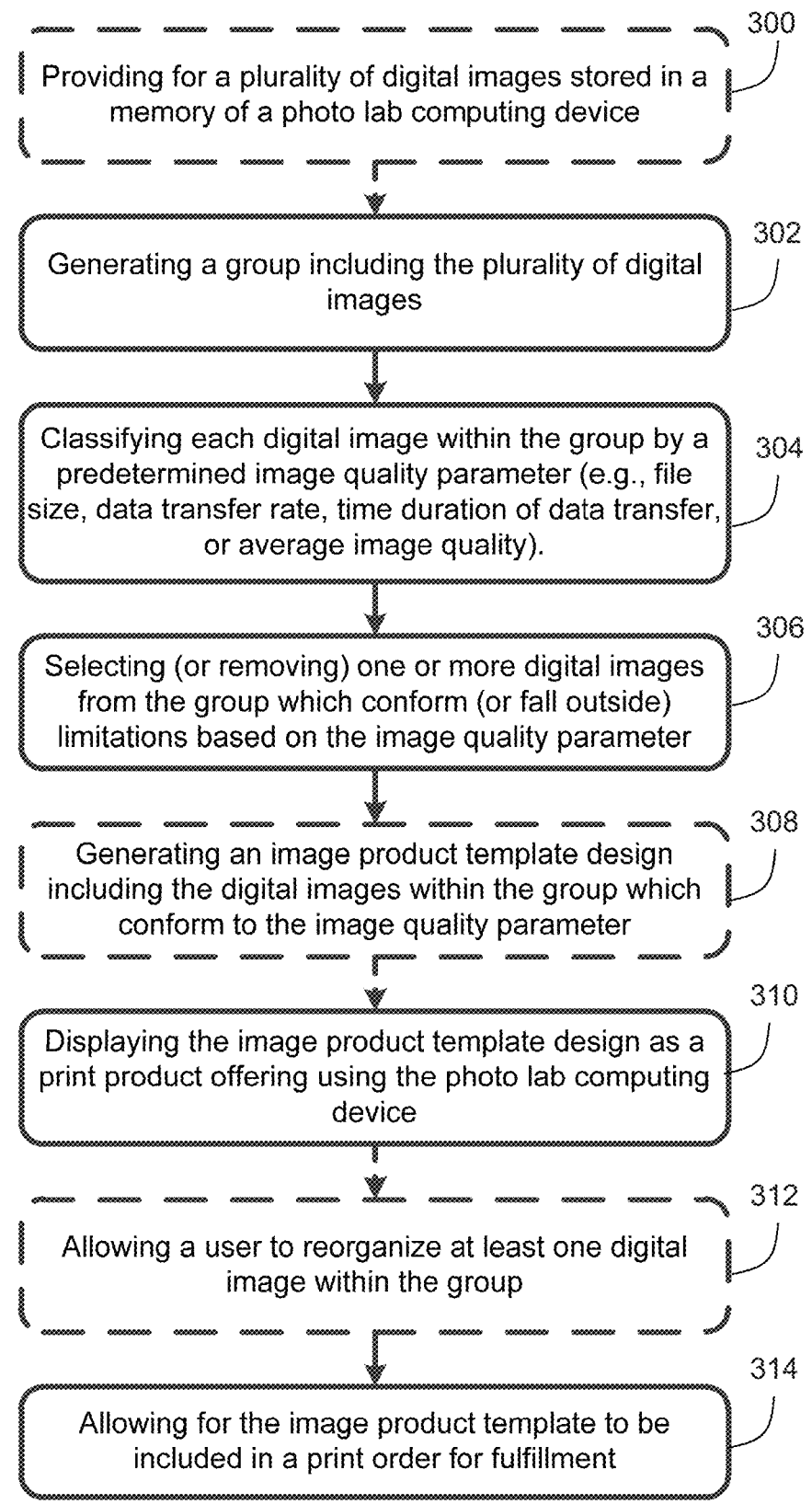
FIG. 3 is a flow diagram for generating a print product offering in accordance with an aspect of the present invention.

As stated above, image organizing module 148 is stored in system memory 136, and operates to assist in generating and displaying the print product offering using photo lab computing device 113. As best shown with particular reference to FIG. 3, the computer implements the algorithmic method of generating and displaying the print product offering using image organizing module 148 comprises optional step 300 to begin preparation of the print product offering by accessing system memory 136 which includes a plurality of digital images which have been uploaded and stored in the system memory 136. The plurality of digital images may include one or more digital images stored in the system memory 136 by user 125, regardless of whether such digital images were selected by user 125 to be included in a print product that is the subject of another print order or not. The method further includes generating a group which includes the plurality of uploaded digital images, at step 302.

In accordance with an aspect of the invention, the method further comprises step 304 which provides for classifying each digital image within the group, or the group as a whole, based on at least one image quality parameter, wherein the classification includes determining whether either conforming or not conforming to the at least one image quality parameter. The image quality parameter is defined as any type of metric(s) that is indicative of the quality of the respective digital image, including, but not limited to, image quality (sharpness, brightness, contrast, saturation, etc.), image size (dimensions represented by pixels and scan lines), image file size (compressed and/or uncompressed), data transfer rates, data transfer durations, image content (e.g., faces, buildings, other classifications), image characteristics and measurements (e.g., image organizer scores)). The image quality parameter may be a predetermined parameter or a parameter that is dynamic depending on one or more characteristics of each digital image or the group of digital images.

For example, the image quality parameter may be based on the file size of each digital image that was uploaded from a device 166 connected to media drive 145 (e.g., smart phone, flash memory devices, etc.), from a printed image that is scanned in using scanner 158, or transferred from data storage server 160 to system memory 136 of photo lab computing device 113. If, for example, the file size for a particular digital image is above a certain minimum image file size (for example, but not limited to, 2 MB), it is presumed that this digital image is of sufficient quality to be included in the print product offering. Further, the image quality parameter may be based on the cumulative file size of the entire group of digital images as being greater than a predetermined minimum file size (for example, but not limited to, 10 MB), wherein the group of digital images as a whole must be greater than or equal to the predetermined minimum file size in order for the print product offering to be generated and displayed. Also, the image quality parameter may be based on an average image file size, wherein the average image file size for the digital images that are uploaded is calculated, followed by selecting those digital images that are equal to or greater than the average image file size. This aspect is based on the premise that if each digital image or the group meets or exceeds a file size threshold, the digital images are of a certain minimum quality (e.g., resolution) to generate and display a print product offering that can in turn be fulfilled as a quality print product.

In another example, the predetermined image quality parameter may be based on the data transfer rate of the digital image being transferred from device 166 connected to media drive 145, or the data transfer rate of the digital image being transferred from data storage server 160 to system memory 136 of photo lab computing device 113, which may cover both the internal rate and/or the external rate as well as measured as a disk-to-buffer rate or buffer-to-computer rate. This data transfer rate may be expressed as the data signaling rate (DSR) being the aggregate rate determined by the average number of bits per second (bit/s) and may be determined by an electronic component or application module at any point along signal bus 124. The DSR may also be calculated by the average number of bytes, average number of characters or symbols (baud rate), average number of blocks or frames, each of which passing from their respective storage (e.g., flash drive) unit to system memory 136, and may also be calculated over any period of time (e.g., minutes, hours, etc.). The formula for a data transfer rate may be the: channel width (bits/transfer)× transfers/second=bits transferred/second, but other applicable formulas may be used as known by those skilled in the art. In certain instances, this data transfer rate may be calculated as transfers per second (i.e., the number of operations transferring data that occur in each second) or hence the sample rate (i.e., number of data samples captured per second) through an applicable formula. It should be further understood that at least part of the information regarding this data transfer rate may be incorporated into the image property of a respective digital image as a tag, keyword, title, or metadata.

In another example, the image quality parameter may also be based on the time duration of data transfer. Similar to the data transfer rate calculations, discussed above, the time duration of data transfer is simply the measurement of the time required to complete the data transfer from device 166 connected to media drive 145, or data storage server 160 to system memory 136 of photo lab computing device 113. The time duration of the data transfer can be based on each individual digital image in the group, or the time duration of the data transfer of the entire group of digital images. It should be understood that at least part of the information regarding this data transfer rate may be incorporated into the image property of a particular digital image as a tag, keyword, title, or metadata.

In a further example, the image quality parameter may be based on the average image quality, which is determined by the image organizing module 148 based on certain characteristics of each digital image, such as, but not limited to, sharpness, brightness, contrast, saturation, etc. In one aspect, image organizing module 148 may provide an original score to the digital image based upon these characteristics. Once all digital images are provided an original score, an aggregate score is calculated based upon each of these original scores. The aggregate score may be one of the statistical mean, median, or mode of these original scores. A scaled score is then calculated and provided for each digital image by subtracting its original score from the aggregate score. The digital image with the highest scaled score indicates that its images quality is better that the image quality of the other digital images that were evaluated using this method. Using this method, the method may be used to generate the print product offering using the digital images with a scaled score that is above a certain mean, median, or mode of the scaled scores, for example. Each step in calculating the scaled scores may be conducted as at least a part of an algorithmic method of an application module incorporated into system memory 136. It should be understood that information regarding the scaled score and other image quality characteristics may be incorporated into the image property of each digital image as a tag, keyword, title, or metadata.

The method further includes either selecting images in the group which satisfy the limitations based upon the image quality parameter, or removing digital images from the group that fall outside limitations based upon the image quality parameter, at step 306. As indicated above, such limitations may be a predetermined data transfer rate number, data transfer time duration number, image file size, image size, or scaled score number. For example, image organizing module 148 may be programed to incorporate a data transfer rate number of 1500 MB/s. As such, image organizing module 148 would be programmed to remove any digital images having a data transfer rate of less than 1500 MB/s since this data transfer rate falls outside the image quality parameter. Image organizing module 148 would therefore remove those digital images from the group and return them back to system memory 136 or completely erase the digital images from computer 112.

The method further comprises step 308 of generating an image product template having a design which is generally representative of the digital images within the group conforming to the quality parameter limitations. The template design is generally a pre-developed electronic image product layout that has been created and stored in image organizing module 148 or system memory 136 and used to make new image products including the digital images within the group that meet the image quality parameter. As generally selected by user 125 or automatically selected by image organizing module 148, the template may be formatted as any print product ultimately produced by finishers 142a, 142b, such as those discussed above, for example, photographic print, calendar, mug, poster, T-shirt, mouse pad, quilt, photobook and the like. Moreover, such templates may comprise a plurality of virtual orifices (not shown) in which a respective digital image may be positioned or incorporated either automatically by image organizing module 148 or by user 125. For example, if user 125 selects to generate a photobook, for example, image organizing module 148 may populate each orifice with a respective, designated digital image from the group. Once all digital images have been placed in their respective orifice, image organizing module 148 may then tailor the template accordingly. In this step, image organizing module 148 may also provide a specific design to the template. As such, when the template is a photobook, for example, image organizing module 148 may provide the portions of the template bordering one or more orifices with a color corresponding to that most found in the digital images. In another example, image organizing module 148 may provide these orifice surrounding portions with the image substance or a pattern found in one of the digital images. Other design examples may even include all orifice surrounding portions of the template to remain unfilled or colorless/blank.

The method further comprises displaying the template design as a print product offering on display 140, at step 310. As such, image organizing module 148 may provide the populated template and corresponding design directly via system bus 124 or indirectly via system memory 136. Image organizing module 148 may otherwise provide the populated template and corresponding design to another application module within system memory 136 before the template and design are provided to display 140. Once provided, a GUI image effect of the populated template and corresponding design can be viewed by one or more users 125. This image effect may be in two dimensions or three dimensions, or any other artifact which adequately depicts the populated template and corresponding print product offering for the user 125.

The method comprises the optional step 312, which allows user 125 to reorganize at least one digital image within the displayed print product offering. Here, user 125 may enter one or more commands into computer 113 that rearranges the digital images in the template by generally removing certain digital images or moving certain digital images from one orifice to another. In essence, user 125 is given an opportunity to customize the template design before it is incorporated into a print order.

The method further comprises step 314, which allows for the template design to be included within a print order. In order to do so, image organizing module 148 typically compiles the computer-executable instructions which embody the template design and transforms these instructions into ones that can be received and read as print orders by the appropriate finishing device 142a, 142b. As explained above, once designated as a print order, the appropriate finishing device 142a, 142b may analyze the instructions to manufacture a print product.

While an exemplary machine-algorithm method for image organizing module 148 has been described above and with reference to the figures above, it will be understood that certain exemplary embodiments may change the order of steps of the algorithmic method or may even eliminate or modify certain steps.

The constructions described above and illustrated in the drawings are presented by way of example only and are not intended to limit the concepts and principles of the present invention. As used herein, the terms "having" and/or "including" and other terms of inclusion are terms indicative of inclusion rather than requirements.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A computer-implemented method of generating and displaying a print product offering including a plurality of digital images using a photo lab computing device comprising a memory and a processor, the method utilizing the processor comprising the steps of:
   providing a plurality of digital images stored in the memory;
   generating a group of digital images from the plurality of digital images;
   classifying each of the digital images within the group based on at least one image quality parameter, wherein the at least one image quality parameter includes a predetermined minimum file size and an average image quality based on at least one characteristic of the digital images;
   selecting only the digital images in the group which conform to the at least one image quality parameter for inclusion in the print product offering, wherein the at least one image quality parameter is predetermined so that the selected digital images are of sufficient quality to be included in the print product offering;

providing a pre-developed electronic image product layout including a plurality of virtual orifices;

populating the plurality of virtual orifices with only the digital images which conform to the at least one image quality parameter such that a cumulative file size of the group of digital images as a whole is greater than or equal to the predetermined minimum file size to provide an image product template design; and displaying the image product template design as the print product offering on a display of the photo lab computing device.

2. The method in accordance with claim 1, wherein the at least one image quality parameter further includes an average image file size, wherein the average image file size is calculated by taking a sum of an image file size of each of the digital images in the group of digital images and dividing the sum by a total number of the digital images in the group of digital images, and wherein the digital images that are selected from the group as conforming to the at least one image quality parameter have image file sizes that are greater than or equal to the average image file size.

3. The method in accordance with claim 1, further comprising the step of allowing for the print product offering to be included in a print order for fulfillment as a print product.

4. The method in accordance with claim 3, further comprising:
providing a finishing device in communication with the photo lab computing device;
receiving the print order at the finishing device; and
manufacturing the print product identified in the print order using the finishing device.

5. The method in accordance with claim 1, wherein the photo lab computing device is a kiosk.

6. The method in accordance with claim 1, wherein the memory of the photo lab computing device is a remote memory accessible through a network.

7. The method in accordance with claim 1, further comprising:
providing an image-based photo ordering website in communication with the photo lab computing device through a network; and
allowing the plurality of digital images to be uploaded to the memory of the photo lab computing device through the image-based photo ordering website.

8. The method in accordance with claim 1, further comprising allowing for one or more of the digital images included in the image product template design to be reorganized.

9. A computer-implemented method of generating and displaying a print product offering including a plurality of digital images using a photo lab computing device comprising a memory and a processor, the method utilizing the processor comprising the steps of:
providing a plurality of digital images stored in the memory;
generating a group of digital images from the plurality of digital images;
classifying each of the digital images within the group based on at least one image quality parameter, wherein the at least one image quality parameter includes an average image quality based on at least one of a sharpness, a brightness, a contrast, or a saturation of the digital images;
selecting only the digital images in the group which conform to the at least one image quality parameter for inclusion in the print product offering, wherein the at least one image quality parameter is predetermined so that the selected digital images are of sufficient quality to be included in the print product offering;
providing a pre-developed electronic image product layout including a plurality of virtual orifices;
populating the plurality of virtual orifices with only the digital images which conform to the at least one image quality parameter to provide an image product template design; and
displaying the image product template design as the print product offering on a display of the photo lab computing device,
wherein the at least one image quality parameter further includes a predetermined data transfer rate compared to a data transfer rate upon transferring the plurality of digital images into the memory of the photo lab computing device, and wherein the digital images that are selected from the group as conforming to the at least one image quality parameter have data transfer rates that are greater than or equal to the predetermined data transfer rate.

10. The method in accordance with claim 1, wherein the at least one image quality parameter further includes a minimum image size for each of the plurality of digital images, wherein the minimum image size corresponds to at least one of a number of pixels or scan lines.

11. A computer-implemented method of generating and displaying a print product offering including a plurality of digital images using a photo lab computing device comprising a memory and a processor, the method utilizing the processor comprising the steps of:
providing a plurality of digital images stored in the memory;
generating a group of digital images from the plurality of digital images;
classifying each of the digital images within the group based on at least one image quality parameter, wherein the at least one image quality parameter includes an average image quality based on at least one characteristic of the digital images;
selecting only the digital images in the group which conform to the at least one image quality parameter for inclusion in the print product offering, wherein the at least one image quality parameter is predetermined so that the selected digital images are of sufficient quality to be included in the print product offering;
providing a pre-developed electronic image product layout including a plurality of virtual orifices;
populating the plurality of virtual orifices with only the digital images which conform to the at least one image quality parameter to provide an image product template design; and
displaying the image product template design as the print product offering on a display of the photo lab computing device,
wherein the at least one image quality parameter further includes a predetermined amount of time compared with a time duration of data transfer upon transferring the plurality of digital images into the memory of the photo lab computing device, and wherein the digital images that are selected from the group as conforming to the at least one image quality parameter have time durations of data transfer that are greater than or equal to the predetermined amount of time.

12. A non-transitory computer-readable medium having thereon computer-executable instructions for performing a computer-implemented method for generating and displaying a print product offering including a plurality of digital images using a photo lab computing device comprising a memory and a processor, and wherein a plurality of digital images are stored in the memory, the method utilizing the processor comprising the steps of:

generating a group of digital images from the plurality of digital images;

classifying each of the digital images within the group based on at least one image quality parameter, wherein the at least one image quality parameter includes a predetermined minimum file size and an average image quality based on at least one characteristic of the digital images;

selecting only the digital images in the group which conform to the at least one image quality parameter for inclusion in the print product offering, wherein the at least one image quality parameter is predetermined so that the selected digital images are of sufficient quality to be included in the print product offering;

providing pre-developed electronic image product layout including a plurality of virtual orifices;

populating the plurality of virtual orifices with only the digital images which conform to the at least one image quality parameter such that a cumulative file size of the group of digital images as a whole is greater than or equal to the predetermined minimum file size to provide an image product template design; and displaying the image product template design as the print product offering photo lab computing device.

13. The computer-readable medium in accordance with claim 12, wherein the method utilizing the processor further comprises the steps of:

determining an original image quality score for each of the digital images based on the at least one of a sharpness, a brightness, a contrast, or a saturation of the digital images;

calculating an aggregate image quality score for the group of digital images based on the original image quality scores determined for each of the digital images;

calculating a scaled image quality score for each of the digital images based on a difference between the aggregate image quality score of the group of digital images and the original image quality score of each of the digital images; and selecting only the digital images in the group as conforming to the average image quality having scaled image quality scores that are greater than or equal to a certain mean, median, or mode of the scaled image quality scores.

14. A computer-implemented system for generating and displaying a print product offering including a plurality of digital images, the system comprising:

a photo lab computing device comprising a memory, a processor, and a display, wherein a plurality of digital images are stored in the memory, and wherein the memory has an image organizing module stored therein, wherein the image organizing module utilizes the processor to:

a) generate a group of digital images from the plurality of digital images;

b) classify each of the digital images within the group based on at least one image quality parameter, wherein the at least one image quality parameter includes a predetermined minimum file size and an average image quality based on at least one characteristic of the digital images;

c) select only the digital images in the group which conform to the at least one image quality parameter for inclusion in the print product offering, wherein the at least one image quality parameter is predetermined by the image organizing module so that the selected digital images are of sufficient quality to be included in the print product offering;

d) provide a pre-developed electronic image product layout including a plurality of virtual orifices;

e) populate the plurality of virtual orifices with only the digital images which conform to the at least one image quality parameter such that a cumulative file size of the group of digital images as a whole is greater than or equal to the predetermined minimum file size to provide an image product template design; and f) display the image product template design as the print product offering on the display of the photo lab computing device.

15. The system according to claim 14, wherein the image organizing module further utilizes the processor to:

determine an original image quality score for each of the digital images based on the at least one of a sharpness, a brightness, a contrast, or a saturation of the digital image;

calculate an aggregate image quality score for the group of digital images based on the original image quality scores determined for each of the digital images;

calculate a scaled image quality score for each of the digital images based on a difference between the aggregate image quality score of the group of digital images and the original image quality score of each of the digital images; and selecting only the digital images in the group as conforming to the average image quality having scaled image quality scores that are greater than or equal to a certain mean, median, or mode of the scaled image quality scores.

* * * * *